United States Patent
Ren et al.

(10) Patent No.: US 12,389,288 B2
(45) Date of Patent: Aug. 12, 2025

(54) SIMULTANEOUS HANDOVER AND CARRIER AGGREGATION CONFIGURATION

(71) Applicant: Telefonaktiebolaget LM Ericsson (publ), Stockholm (SE)

(72) Inventors: Hong Ren, Kanata (CA); Tao Cui, Upplands Väsby (SE); Geoffrey McHardy, Carp (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 553 days.

(21) Appl. No.: 17/633,289

(22) PCT Filed: Aug. 22, 2019

(86) PCT No.: PCT/IB2019/057090
§ 371 (c)(1),
(2) Date: Feb. 7, 2022

(87) PCT Pub. No.: WO2021/033016
PCT Pub. Date: Feb. 25, 2021

(65) Prior Publication Data
US 2022/0369179 A1 Nov. 17, 2022

(51) Int. Cl.
*H04W 36/00* (2009.01)
*H04L 5/00* (2006.01)

(52) U.S. Cl.
CPC ....... *H04W 36/00692* (2023.05); *H04L 5/001* (2013.01); *H04L 5/0091* (2013.01)

(58) Field of Classification Search
CPC ......... H04W 36/0069; H04W 36/0072; H04W 36/0083; H04W 40/08; H04W 36/00725;
(Continued)

(56) References Cited

U.S. PATENT DOCUMENTS

| 2011/0292911 A1* | 12/2011 | Uemura | H04W 36/0072 370/331 |
| 2013/0301509 A1* | 11/2013 | Purnadi | H04W 36/0083 370/312 |

(Continued)

FOREIGN PATENT DOCUMENTS

CN 105210416 A 12/2015

OTHER PUBLICATIONS

Ericsson: "DC based handover", 3GPP Draft; R2-1907317, vol. RAN WG2, No. Reno, USA; May 13-17, 2019.*
(Continued)

*Primary Examiner* — Jungwon Chang
(74) *Attorney, Agent, or Firm* — Weisberg I.P. Law, P.A.

(57) ABSTRACT

A target cell for handover of a wireless device from a source cell to the target cell is provided. The target cell includes processing circuitry configured to: determine to configure the source cell as a downlink carrier aggregation secondary cell, DL CA SCell, for the wireless device, and cause transmission of an indication to the source cell to at least one of: temporarily retain, after the handover, at least a portion of information specific to the wireless device; and transmit the at least the portion of information specific to the wireless device to the target cell. The indication is based at least in part on the determination.

22 Claims, 8 Drawing Sheets

(58) Field of Classification Search
CPC ............ H04W 36/00692; H04W 36/08; H04L 5/0091; H04L 5/001
USPC .......................................................... 370/331
See application file for complete search history.

(56) References Cited

U.S. PATENT DOCUMENTS

| | | | |
|---|---|---|---|
| 2014/0211756 | A1 | 7/2014 | Bontu et al. |
| 2019/0253945 | A1* | 8/2019 | Paladugu ............... H04W 36/18 |
| 2019/0349822 | A1* | 11/2019 | Kim ................... H04W 36/0069 |
| 2020/0045596 | A1* | 2/2020 | Liu .................... H04W 36/0072 |
| 2020/0100166 | A1* | 3/2020 | Harel .................... H04W 40/08 |
| 2021/0195479 | A1* | 6/2021 | Wei ....................... H04W 76/27 |

OTHER PUBLICATIONS

Chinese Office Action and English Summary translation of the Chinese Office Action dated Dec. 8, 2023 issued in Chinese Patent Application No. 201980101603.1, consisting of 14 pages.
International Search Report and Written Opinion of the International Searching Authority dated Apr. 20, 2020 issued in PCT Application No. PCT/IB2019/057090 , consisting of 14 pages.
R2-1907317 (Revision of R2-1903509); 3GPP TSG-RAN WG 2#106; Title: DC Based Handover; Source: Ericsson; Agenda Item: 11.9.2.2; Document for: Discussion; Reno, USA, May 13-17, 2019, consisting of 6 pages.
R2-1911139 (Resubmission of R2-1907482); 3GPP TSG-RAN WG2#107; Title: Direct SCell State Configuration for RRC Resume; Source: Huawei, HiSilicon; Agenda Item: 11.10.4.1; Document for: Discussion and Decision; Prague, Czech Republic, Aug. 26-30, 2019, consisting of 2 pages.
R3-192688; 3GPP TSG-RAN WG3#104; Title: DC Based Handover; Source: Huawei; Agenda item: 18.2.1; Document for: Discussion and Decision, Reno, USA, May 13-17, 2019, consisting of 4 pages.
Communication pursuant to Article 94(3) EPC of European Application No. 19 780 363.8, dated May 8, 2024, consisting of 8 pages.
H. Wang et al., DoCoMo Communications Laboratories Europe GmbH, Munich, Germany, The 14th IEEE 2003 International Symposium on Personal, Indoor and Mobile Radio communication Proceedings, Title: Security Context Transfer in Vertical Handover, dated Sep. 10, 2003, consisting of 5 pages.

* cited by examiner

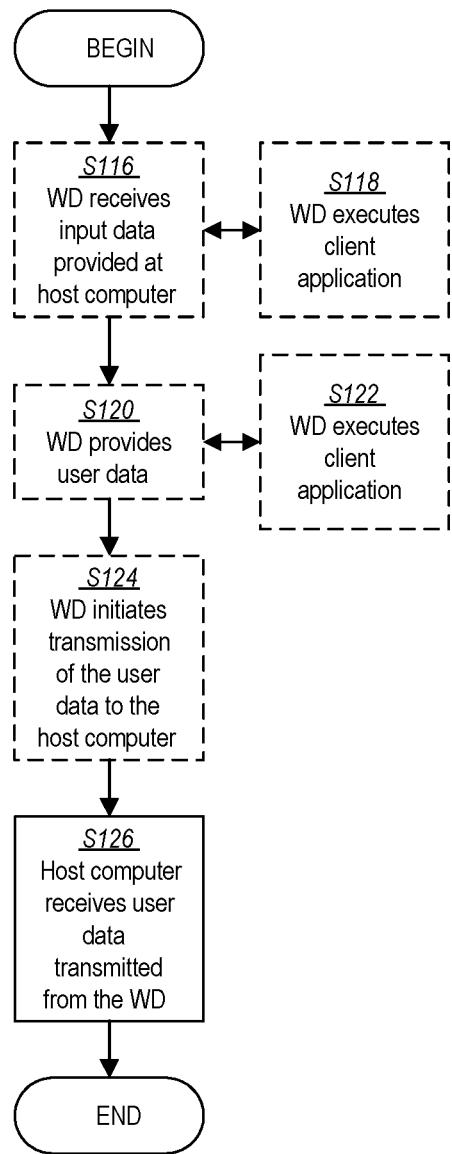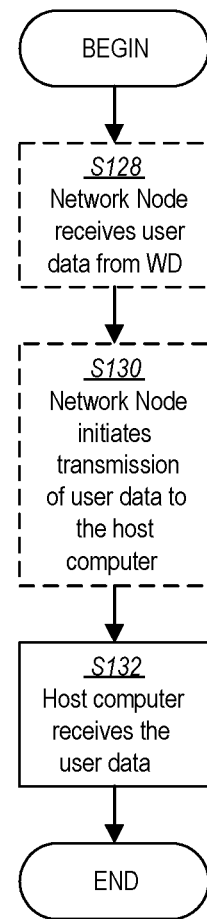
FIG. 7
FIG. 8

SIMULTANEOUS HANDOVER AND CARRIER AGGREGATION CONFIGURATION

CROSS-REFERENCE TO RELATED APPLICATIONS

This application is a Submission Under 35 U.S.C. § 371 for U.S. National Stage Patent Application of International Application Number: PCT/IB2019/057090, filed Aug. 22, 2019 entitled "SIMULTANEOUS HANDOVER AND CARRIER AGGREGATION CONFIGURATION," the entirety of which is incorporated herein by reference.

TECHNICAL FIELD

Wireless communication and in particular, to performing a handover process and carrier aggregation configuration at the same time.

BACKGROUND

3$^{rd}$ Generation Partnership Project (3GPP) specifications LTE (Long Term Evolution) and NR (New Radio) both define event triggered measurements of downlink (DL) quality. FIG. 1 is a diagram of different cell edges in the DL and uplink (UL) where a macro network node 2a and micro network node 2b (collectively referred to as network node 2) provide respective cells for one or more wireless devices 4a-4b (collectively referred to as wireless device 4). In particular, macro network node 2a provides macro cell and the micro network node 2b provides a micro cell. The wireless device 4 measures DL quality in terms of, for example, RSRP (Reference Signal Received Power) or RSRQ (Reference Signal Received Quality) and sends measurement reports to network nodes 2 such as eNB (Evolved Node B) or gNB (Next Generation Node B). The network nodes 2 may then use the measurement reports to make mobility decisions about, for example, the wireless device 4.

In some existing systems, uplink (UL) triggered handover may be needed in some scenarios. For example, one such scenario may be an LTE scenario where a micro cell and macro cell are deployed on the same frequency, i.e., use the same frequency. The intra-frequency handover border between these two cells may be where the radio quality is similar in micro cell or macro cell. However, due to larger transmit power from macro cell, the different UL and DL cell edges may vary. For example, the DL cell edge is closer to micro cell, while the UL cell edge is essentially at the middle point between the two macro and micro cells. Therefore, if handover is based on DL quality, the UL for wireless devices 4 in the macro cell may not be able to reach the handover region. In addition, strong UL interference in the micro cell may be created due to the use of high transmit power.

The frequency in which the two cells, i.e., macro cell and micro cell, described above are deployed is denoted as f1. It is possible that there is an overlaid macro cell on a different frequency f2, which has a larger DL and UL coverage, as shown in FIG. 2. In this case, when a wireless device 4 moves out of the UL coverage of the macro cell on f1, the UL triggered mobility mechanism may allow the wireless device(s) 4 to be moved to the larger macro cell on f2, thereby helping prevent wireless device(s) from experiencing issues on the UL or even dropped calls in the macro cell in frequency f1. The configuration of FIG. 2 also helps minimize the UL interference to wireless devices 4 in the micro cell in frequency f1. If the wireless device 4 is capable of performing carrier aggregation (CA) across the two carriers, the macro cell on f1 can be configured as a DL secondary cell (Scell) such that the wireless device can continue to use the macro cell for DL signaling and data.

Further, in NR, the DL and UL for mid-band and high band may not balance in terms of coverage and/or performance. This may lead to wireless devices 4 in those bands, experiencing poor UL performance (e.g., performance such as throughput being below a performance threshold) while DL performance may remain good (e.g., performance such as throughput meeting a performance threshold). In particular, poor UL throughput (e.g., throughput below a threshold) may lead to poor DL throughput (although the DL link quality may still be good, i.e., satisfy a threshold) in some cases such as TCP traffic where TCP acknowledgments for DL traffic are sent on the UL. The poor UL may affect the transmission of TCL ACKS and thus the DL throughput. Therefore, UL triggered handover may be needed or preferred over DL triggered handover.

Further, in NR, the DL link quality is measured by the wireless device 4 in a different manner than in LTE. For example, in LTE, the Cell-specific Reference Signal (CRS) is used by the wireless device 4 to measure the DL link quality. The CRS may be used by all wireless devices 4 in a cell; thus, CRS may not be able to be beamformed to point to a specific wireless device 4. However, in NR, each wireless device 4 is configured with wireless device-specific CSI-RS (Channel State Information-Reference Signal) resources where the wireless device-specific CSI-RS can be beamformed to point to a respective wireless device 4. Further, in NR, the beam direction changes as the wireless device 4 moves. Therefore, in NR, the DL link quality may be based on the measurement on the wireless device-specific CSI-RS.

Two types of beamforming techniques can be used in NR: digital beam forming (DBF) and analog beamforming (ABF). For DBF, different groups of Physical Resource Blocks (PRBs) can be used for different wireless devices 4 where signals transmitted from one group of PRBs are beamformed to point to one direction. With ABF, signal transmitted from all sub-carriers for a given OFDM (Orthogonal Frequency Division Multiplexing) symbol are beamformed to point to one direction. For a carrier frequency that is not very high (e.g., below 6 GHz), wide beam CSI-RS (cell-wise) can still be used. For carrier frequency in a high band (e.g., greater than 20 GHz), beamformed CSI-RS may have to be used to ensure coverage.

ABF for high bands is considered where the DL beam management can be performed in the following manner:

Multiple static SSB (Synchronization Signal Block) wide beams may be used to cover an entire cell. Each wireless device 4 may measure the link quality for all SSB beams, and report the best beam of the SSB beams to the network node 2.

Once the network node 2 knows the best SSB beam for the wireless device 4, the network node 2 can transmit multiple CSI-RS narrow beams within the best SSB beam. The wireless device 4 can measure the narrow beams and report the best narrow beam to the network node 2. This best narrow beam is a DL narrow beam that can be used for PDCCH (Physical Downlink Control Channel) and PDSCH (Physical Downlink Shared Channel) transmissions.

Therefore, different transmit power of the network node 2 and the wireless device 4 may cause imbalance between the cell edges in UL and DL, which may negatively affect wireless device 4 performance after handover.

SUMMARY

Some embodiments advantageously provide a method and system for performing a handover process and carrier aggregation configuration at the same time.

In particular, the disclosure describes a method and network node for performing the uplink (UL) triggered handover and downlink (DL) carrier aggregation (CA) configuration at the same time. One or more of the following steps may be implemented for performing such handover (HO) and CA/CA configuration at the same time and/or at least partial overlapping times:
1. For a HO due to UL coverage (i.e., HO triggered by UL performance), when the source cell sends a handover request to the target cell, the source cell may include DL quality measurements about the source cell and the target cell;
2. The target cell determines whether to accept the HO request based at least in part on the estimation of UL quality in the target cell;
3. If the target cell decides to accept the HO request, the target cell may also determine whether to configure the source cell as a DL CA Scell based at least in part on one or more of wireless device capability, source cell DL quality, CA configuration in network, etc.
4. If the target cell decides to configure the source cell as DL CA Scell, the target cell may request the source cell to provide Scell configuration information and may request the source cell to keep some or all of the wireless device specific information.
    The target cell may provide multiple C-RNTI values that are available to the target cell to the source cell. The source cell can select one C-RNTI that is also available to the source cell and may inform the target cell about its C-RNTI selection.
5. The target cell prepares a RRC reconfiguration message for both handover and DL CA Scell configuration, and includes the RRC reconfiguration message in the handover request acknowledgement.

Therefore, overlapping handover and DL CA Scell configuration may advantageously help increase the probability of configuring DL CA for a CA capable wireless device 4 and/or may reduce delay between Scell configuration and user data transmission from the Scell and/or may save processing power at both network node 2 and wireless device 4, among provide other advantages described herein.

According to one aspect of the disclosure, a target cell for handover of a wireless device from a source cell to the target cell is provided. The target cell includes processing circuitry configured to: determine to configure the source cell as a downlink carrier aggregation secondary cell, DL CA SCell, for the wireless device, and cause transmission of an indication to the source cell to at least one of: temporarily retain, after the handover, at least a portion of information specific to the wireless device; and transmit the at least the portion of information specific to the wireless device to the target cell. The indication is based at least in part on the determination.

According to one or more embodiments of this aspect, the processing circuitry is further configured to prepare a radio resource control, RRC, message associated with the handover request and include the DL CA SCell configuration for the source cell in the RRC message. According to one or more embodiments of this aspect, the at least the portion of information specific to the wireless device includes beamforming precoder information. According to one or more embodiments of this aspect, the determination to configure the source cell as the DL CA SCell for the wireless device is made in response to accepting a handover request associated with the source cell.

According to one or more embodiments of this aspect, the processing circuitry is further configured to provide a plurality of cell-radio network temporary identifier, C-RNTI, values to the source to increase a probability of a C-RNTI value being available at both the target cell and the source cell. According to one or more embodiments of this aspect, the processing circuitry is further configured to cause transmission of the DL CA SCell configuration to the source cell during handover. According to one or more embodiments of this aspect, the at least the portion of information specific to the wireless device includes at least one of: a last wireless device reported downlink quality or a latest estimated downlink signal to interference and noise ratio, a last wireless device reported downlink transmission rank, and activated transmission configuration indicator, TCI, states for at least one of physical downlink shared channel and physical downlink control channel.

According to another aspect of the disclosure, a source cell includes processing circuitry configured to: cause transmission of a handover request for handover over of a wireless device from the source cell to a target cell, and receive an indication associated with the handover request to at least one of: temporarily retain, after the handover, at least a portion of information specific to the wireless device, and transmit the at least the portion of information specific to the wireless device to the target cell.

According to one or more embodiments of this aspect, the processing circuitry is further configured to receive a downlink carrier aggregation secondary cell, DL CA SCell, configuration, during handover, for implementation after handover. According to one or more embodiments of this aspect, the processing circuitry is further configured to receive a radio resource control, RRC, message associated with the handover request, the RRC message including a downlink carrier aggregation secondary cell, DL CA SCell, configuration. According to one or more embodiments of this aspect, the at least the portion of information specific to the wireless device includes beamforming precoder information.

According to one or more embodiments of this aspect, the processing circuitry is further configured to receive a plurality of cell-radio network temporary identifier, C-RNTI, values to increase a probability of a C-RNTI value being available at both the target cell and the source cell. According to one or more embodiments of this aspect, the at least the portion of information specific to the wireless device includes at least one of: a last wireless device reported downlink quality or a latest estimated downlink signal to interference and noise ratio; a last wireless device reported downlink transmission rank, and activated transmission configuration indicator, TCI, states for at least one of physical downlink shared channel and physical downlink control channel.

According to another aspect of the disclosure, a method implemented in a target cell for handover of a wireless device from a source cell to the target cell is provided. A determination is made to configure the source cell as a downlink carrier aggregation secondary cell, DL CA SCell, for the wireless device. Transmission is caused of an indication to the source cell to at least one of: temporarily retain, after the handover, at least a portion of information specific to the wireless device; and transmit the at least the portion of information specific to the wireless device to the target cell. The indication is based at least in part on the determination. According to one or more embodiments of this aspect, a radio resource control, RRC, message associated with the handover request is prepared and included the DL CA SCell configuration for the source cell in the RRC message. According to one or more embodiments of this aspect, the at least the portion of information specific to the wireless device includes beamforming precoder information. According to one or more embodiments of this aspect, the determination to configure the source cell as the DL CA SCell for the wireless device is made in response to accepting a handover request associated with the source cell.

According to one or more embodiments of this aspect, a plurality of cell-radio network temporary identifier, C-RNTI, values are provided to the source cell to increase a probability of a C-RNTI value being available at both the target cell and the source cell. According to one or more embodiments of this aspect, transmission is caused of the DL CA SCell configuration to the source cell during handover. According to one or more embodiments of this aspect, the at least the portion of information specific to the wireless device includes at least one of: a last wireless device reported downlink quality or a latest estimated downlink signal to interference and noise ratio, a last wireless device reported downlink transmission rank, and activated transmission configuration indicator, TCI, states for at least one of physical downlink shared channel and physical downlink control channel.

According to another aspect of the disclosure, a method implemented by a source cell is provided. Transmission is caused of a handover request for handover over of a wireless device from the source cell to a target cell. An indication is received where the indication is associated with the handover request to at least one of: temporarily retain, after the handover, at least a portion of information specific to the wireless device, and transmit the at least the portion of information specific to the wireless device to the target cell.

According to one or more embodiments of this aspect, a downlink carrier aggregation secondary cell, DL CA SCell, configuration is received, during handover, for implementation after handover. According to one or more embodiments of this aspect, receiving a radio resource control, RRC, message associated with the handover request is received where the RRC message includes a downlink carrier aggregation secondary cell, DL CA SCell, configuration. According to one or more embodiments of this aspect, the at least the portion of information specific to the wireless device includes beamforming precoder information.

According to one or more embodiments of this aspect, a plurality of cell-radio network temporary identifier, C-RNTI, values is received to increase a probability of a C-RNTI value being available at both the target cell and the source cell. According to one or more embodiments of this aspect, the at least the portion of information specific to the wireless device includes at least one of: a last wireless device reported downlink quality or a latest estimated downlink signal to interference and noise ratio, a last wireless device reported downlink transmission rank, and activated transmission configuration indicator, TCI, states for at least one of physical downlink shared channel and physical downlink control channel.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
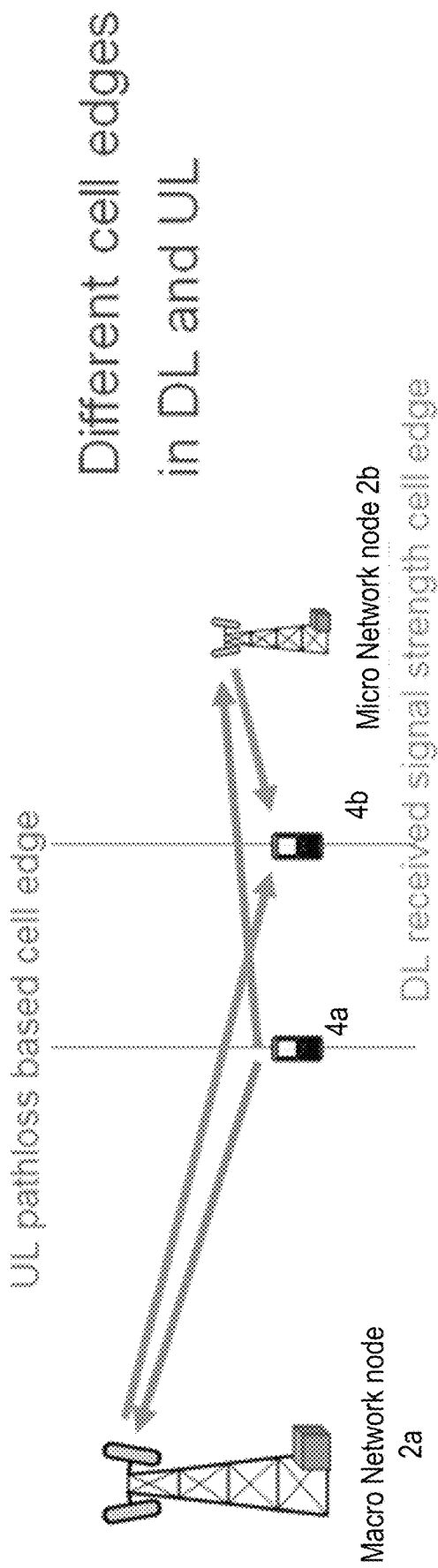
FIG. 1 is a diagram of different cell edges in downlink and uplink communications.

As described above, an UL trigger for handover may be needed and/or preferred in one or more scenarios. One such UL triggered handover mechanism has been developed for LTE. The high-level concept of this UL triggered handover is described below:

The source cell serving a wireless device monitors the wireless device's UL quality. If the UL quality does not meet a performance threshold and/or link quality threshold, the source cell triggers the wireless device to search for other cells on a different carrier frequency, from DL perspective, that meet the performance threshold and/or link quality threshold.

The wireless device measures DL link quality of the neighbor cells and reports cells with good DL link quality (e.g., the DL link quality is greater than a threshold).

The source cell selects a target cell for handover based on wireless device's DL measurement report.

The source cell sends a Handover request to the target cell. The handover request may include the DL qualities for both the source and target cells, and may also contain the estimated UL SINR for the source cell.

After receiving handover request, the target cell estimates the UL quality for the wireless device. If the UL in the target cell is expected to be good enough (i.e., is greater than a threshold and/or better than the UL quality for the source cell), the handover request is accepted.

The target cell prepares RRC reconfiguration message for handover and includes the message in the acknowledgement to the handover request.

The source cell extracts the RRC reconfiguration message and sends it to the wireless device.

This UL triggered handover mechanism function may be implemented in existing systems but is not optimal in one or more scenarios. For example, considering the scenario shown in FIG. 2, when the wireless device is moved to f2 due to bad UL quality in f1, the DL quality in f1 may still be good, i.e., may still meet one or more quality thresholds. If the wireless devices 22 is capable of DL carrier aggregation (CA), the macro cell on f1 can be configured as a DL secondary cell (SCell) while the macro cell on f2 is configured as the DL primary cell (PCell) (assuming CA license on network side is available). The PCell can be the primary cell of a master or secondary cell group.

With the existing UL triggered handover method, the handover is an independent step. Any other functions such as configuring a DL Scell for the wireless device may be initiated after the handover. However, performing handover and DL Scell configuration separately is not optimal in this case for one or more reasons described below.

First, a C-RNTI (Cell Radio Network Temporary Identifier) is assigned to the wireless device during the handover. When a DL Scell is configured later after the handover, the same C-RNTI needs to be allocated by the Scell for the wireless device 22. If the same C-RNTI is not available for the cell, the cell may not be able to be used as a Scell for CA.

Secondly, when a DL SCell is added, the PCell may want to ensure the DL quality with the SCell is good enough (i.e., meet a predefined performance threshold) before the SCell is activated and used for DL data transmission. This may be done by configuring the wireless device to perform DL quality measurement and to send measurement report associated with the measurements. If the wireless device is just handed over from f1 to f2, the DL quality of the new SCell on f1 is known. So, one or more of the configuration for measurement, performing measurement and measurement reporting may not be necessary.

Third, performing handover and DL Scell configuration separately can cause an unnecessary delay between Scell configuration and data transmission from the Scell. Assume a wireless device that initially has a RRC connection in a high band cell (i.e., a cell configured to provide communication in a predefined band), in which analog beamforming is performed for the wireless device. For example, multiple SSB resources are configured for the wireless device. Each SSB resource transmits a wide beam. The wireless device is also configured with multiple CSI-RS resources that allows the wireless device to search for the best narrow beam within an SSB wide beam based, for example, on one or more characteristics of the narrow beams. The best CSI-RS narrow beam(s) is (or are) reported to the network node to help the network node perform DL beamforming for PDCCH and/or PDSCH.

Before the wireless device is handed over to a low band cell (i.e., a cell configured to perform communications on a band lower than the high band) due to a high band UL issue, the network node knows the best wide beam and the best narrow beam for the high band cell. After the handover, the source network node loses the wireless device information while the target network node does not have any information regarding to the best wide and narrow beams. When the high band cell is configured as a DL Scell sometime after handover, the wireless device may be requested to measure all SSB beam(s) and to report, to the network node, the best SSB beam. Then the wireless device may be requested to measure narrow beams within the SSB wide beam to find the best narrow beam. The network may only be able to perform beamforming for PDCCH/PDSCH after the best narrow beam is reported to network node. Hence, there is disadvantageously a delay, after handover is performed, to be able to perform beamforming as configuration is initiated after handover.

Embodiments described herein provide for performing a handover process and carrier aggregation configuration at the same time and/or performing carrier aggregation configuration during the handover process.

Before describing in detail exemplary embodiments, it is noted that the embodiments reside primarily in combinations of apparatus components and processing steps related to performing a handover process and carrier aggregation configuration at the same time. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a network node. A serving cell may be a cell on or via which a network node (the node providing or associated to the cell, e.g., base station, gNB or eNodeB) transmits and/or may transmit data (which may be data other than broadcast data) to a wireless device, in particular control and/or user or payload data, and/or via or on which a wireless device transmits and/or may transmit data to the network node; a serving or source cell may be a cell for or on which the wireless device is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard and/or NR-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Configuring a network node, may refer to the network node being adapted or caused or set and/or instructed to operate according to the configuration. Configuring may be done by another network node (for example, a radio node of the network like a base station, gNB or eNodeB) or network, in which case it may comprise transmitting configuration data/information to the network node to be configured. Such configuration data may represent the configuration to be configured and/or comprise one or more instruction pertaining to a configuration, e.g., a configuration for transmitting and/or receiving on allocated resources, in particular frequency resources, or e.g., configuration for performing certain measurements on certain subframes or radio resources, or e.g., a downlink secondary cell configuration and/or a configuration for at least temporary retaining at least a portion of wireless device specific information after handover. Configuration data may comprise and/or be represented by configuration information, and/or one or more corresponding indications and/or message/s.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
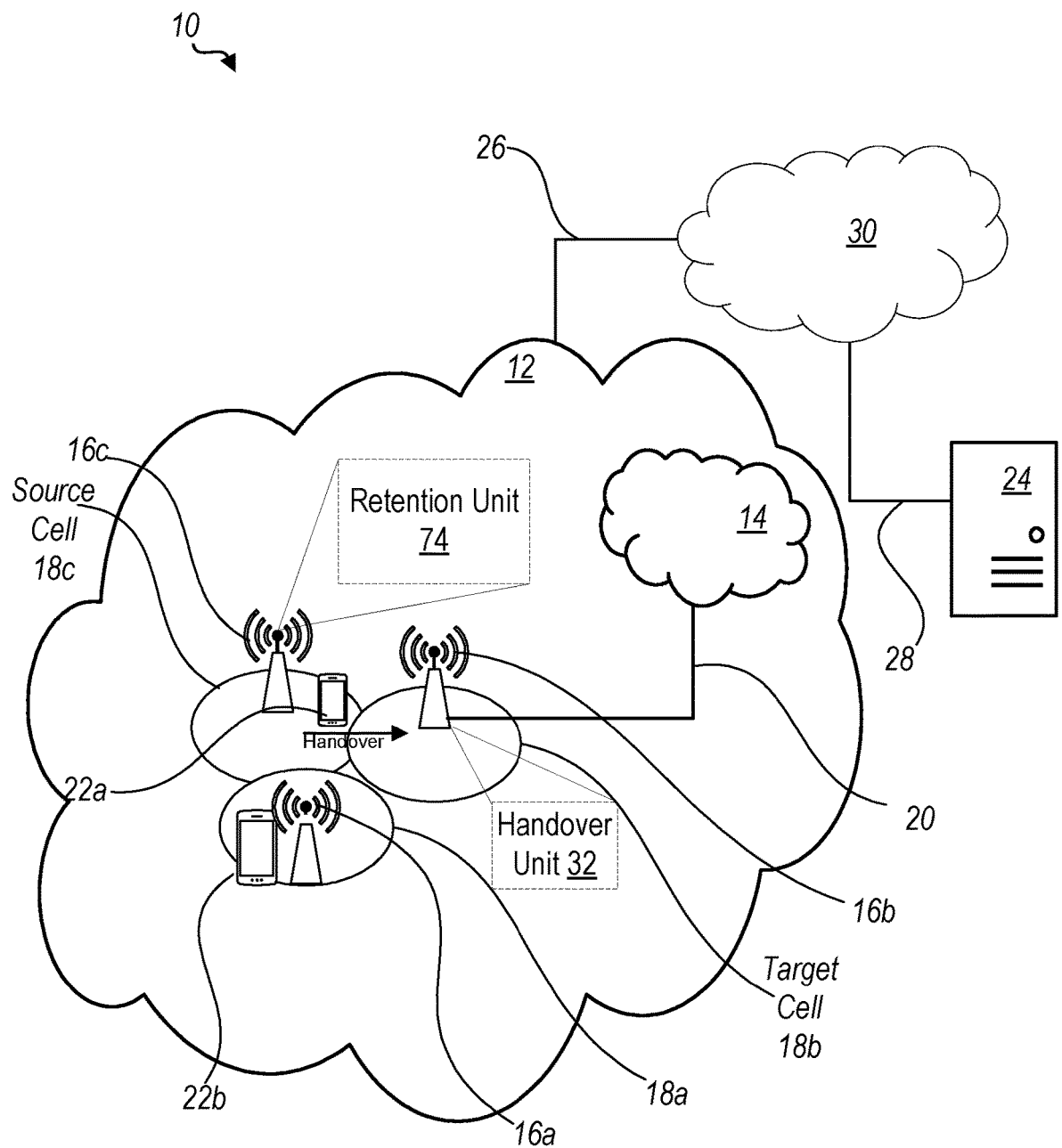
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support wireless communication standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area or cell 18a, 18b, 18c (referred to collectively as cell 18). Each network node 16a, 16b, 16c is connectable to the core network 14 over a wired or wireless connection 20. A first wireless device (WD) 22a located in cell 18a is configured to wirelessly connect to, or be paged by, the corresponding network node 16c. In one or more embodiments, wireless device 22 is being handover from source cell 18c to target cell 18b. A second WD 22b in cell 18a is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the cell or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a handover unit 32 which is configured to perform one or more network node 16 function as described herein such as with respect to a target cell 18 for performing handover and CA configuration at the same time and/or during the handover process. A network node 16 is configured to include a retention unit 74 which is configured to perform one or more network node 16 functions as described herein such as with respect a source cell 18 that may retain wireless device 22 specific information for use in CA after handover.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of process, transmit, receive, communicate, relay, forward, store, etc., information related to performing handover and CA at the same time and/or during the handover process.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 48 stored internally in, for example, memory 72, or stored in external memory (e.g., database, storage array, network storage device, etc.) accessible by the network node 16 via an external connection. The software 48 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 48 may include instructions that, when executed by the processor 70 and/or processing circuitry 68, causes the processor 70 and/or processing circuitry 68 to perform the processes described herein with respect to network node 16. For example, processing circuitry 68 of the network node 16 may include handover unit 32 configured to perform one or more network node 16 functions such as with respect to target cell 18b for performing handover and CA configuration functions at the same time and/or performing CA configuration during the handover process, as described. In another example, processing circuitry 68 of the network node 16 may include retention unit 74 configured to perform one or more network node 16 functions such as those functions with respect to retention of at least some wireless device 22 specific information for use as a secondary cell 18c after handover. In one or more embodiments, whether network node 16, which provide cell 18, includes and/or uses one or more of handover unit 32 and retention unit 74 may depend on whether cell 18 is a source cell 18c or a target cell 18b as handover unit 32 may be directed to functionality performed by, for example, the target cell 18b, and retention unit 74 may be directed to functionality performed by, for example, the source cell 18c.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 4:
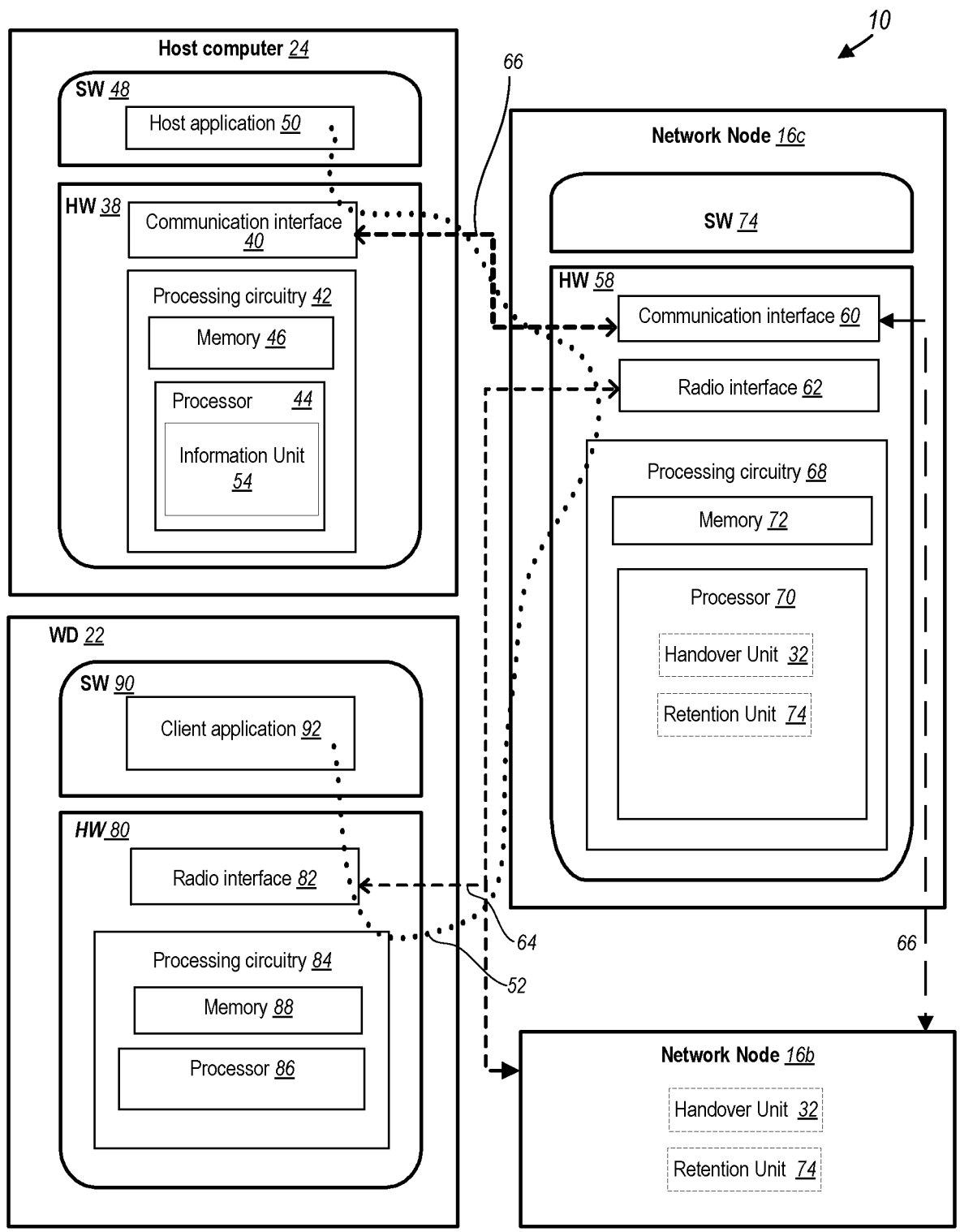
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as handover unit 32, and retention unit 74 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 2:
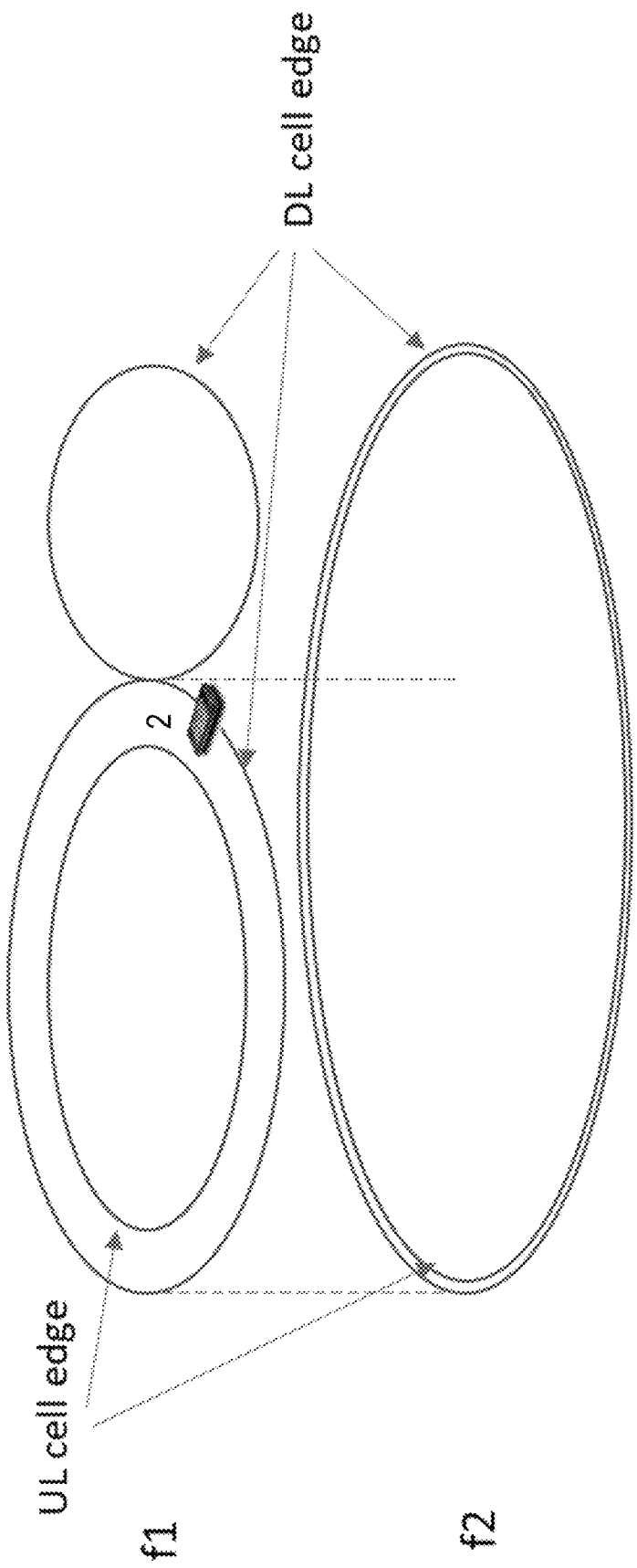
FIG. 2 is a diagram of uplink triggered handover to a different frequency.
Figures 5, 6:
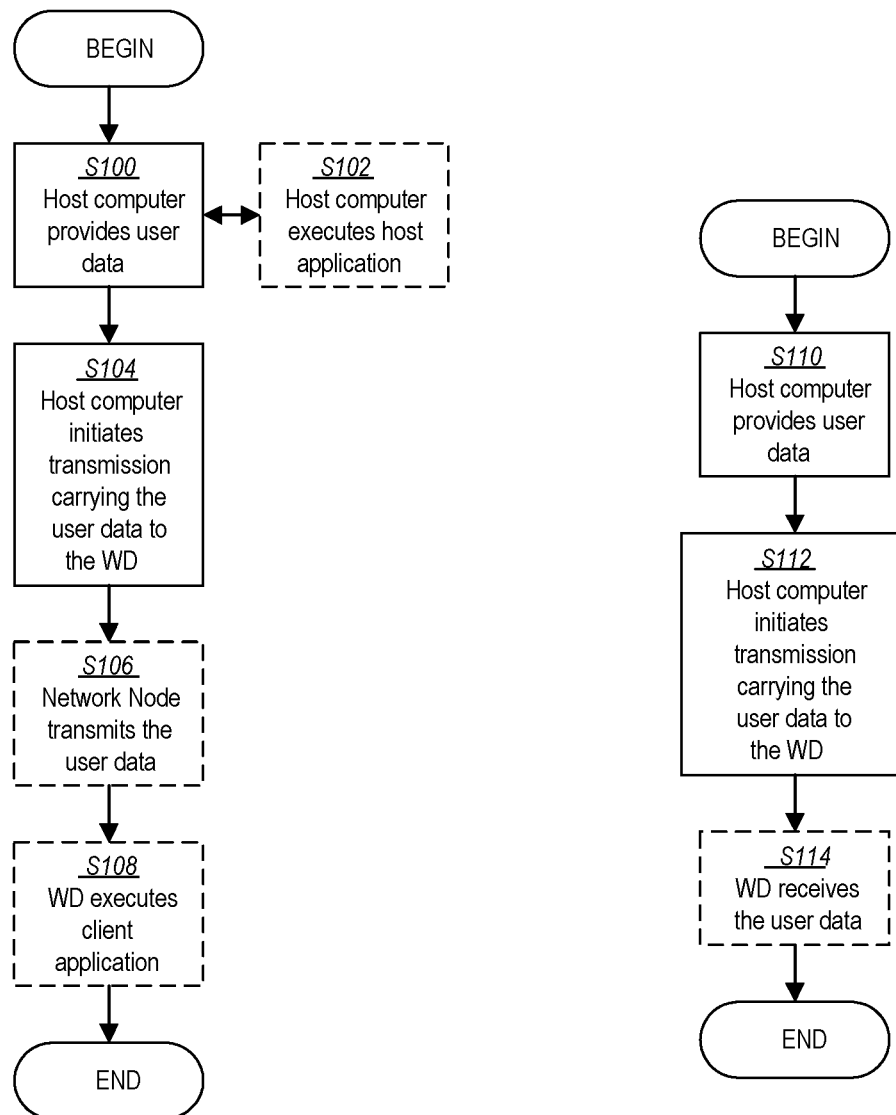
FIG. 5 is a flowchart illustrating exemplary methods implemented in a communication system including a host computer, a network node and a wireless device for executing a client application at a wireless device according to some embodiments of the present disclosure.
FIG. 6 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
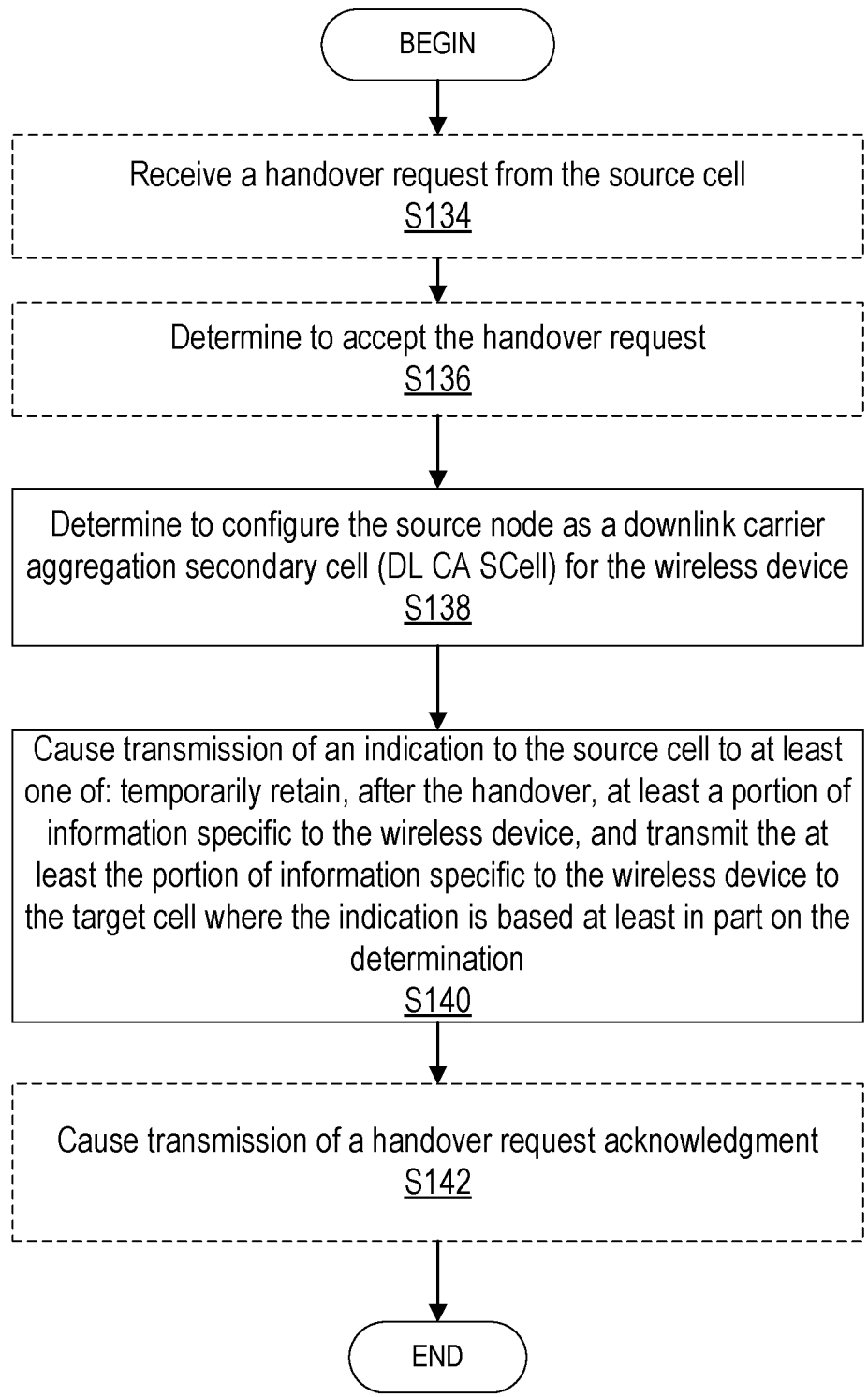
FIG. 9 is a flowchart of an exemplary process in a target cell according to some embodiments of the present disclosure.

FIG. 9 is a flowchart of an exemplary process in a target cell 18b according to some embodiments of the disclosure. One or more Blocks and/or functions performed by target cell 18b provided by network node 16b may be performed by one or more elements of network node 16b such as by handover unit 32 in processing circuitry 68, processor 70, radio interface 62, etc. In one or more embodiments, target cell 18b, which may be provided by network node 16b, such as via one or more of processing circuitry 68, processor 70, communication interface 60, handover unit 32 and radio interface 62 is configured to optionally receive (Block S134) a handover request from the source cell 18c, as described herein. In one or more embodiments, target cell 18b, which may be provided by network node 16b, such as via one or more of processing circuitry 68, processor 70, communication interface 60, handover unit 32 and radio interface 62 is configured to optionally determine (Block S136) to accept the handover request, as described herein.

In one or more embodiments, target cell 18b, which may be provided by network node 16b, such as via one or more of processing circuitry 68, processor 70, communication interface 60, handover unit 32 and radio interface 62 is configured to determine (Block S138) to configure the source cell 18c as a downlink carrier aggregation secondary cell 18 (DL CA SCell 18) for the wireless device 22, as described herein. In one or more embodiments, target cell 18b, which may be provided by network node 16b, such as via one or more of processing circuitry 68, processor 70, communication interface 60, handover unit 32 and radio interface 62 is configured to cause (Block S140) transmission of an indication to the source cell 18c to at least one of: temporarily retain, after the handover, at least a portion of information specific to the wireless device 22, and transmit the at least the portion of information specific to the wireless device 22 to the target cell 18b. The indication is based at least in part on the determination. For example, the indication may further indicate or alternatively indicate for the source cell 18c to send the wireless device 22 specific information to the target cell 18b if a central scheduler is implemented in the Pcell, which is the target cell 18b for handover. The information specific to the wireless device 22 may include wireless device 22 state information.

In one or more embodiments, one or more of the processing circuitry 68, processor 70, communication interface 60, handover unit 32, radio interface 62, etc. may be configured to provide to the target cell 18b and/or receive from the target cell 18b information such as a list or indication of a list of available CRNTI(s), i.e., CRNTI values. In comparison, the wireless device 22 specific information may be sent to the Pcell, in one or more embodiments, when a central scheduler is in the Pcell. In one or more embodiments, target cell 18b, which may be provided by network node 16b, such as via one or more of processing circuitry 68, processor 70, communication interface 60, handover unit 32 and radio interface 62 is configured to optionally cause (Block S142) transmission of a handover request acknowledgment, as described herein.

According to one or more embodiments, the processing circuitry 68 of, for example, network node 16b providing target cell 18b, is further configured to prepare a radio resource control, RRC, message associated with the handover request and include the DL CA SCell configuration for the source cell 18c in the RRC message. According to one or more embodiments, the at least the portion of information specific to the wireless device 22 includes beamforming precoder information. According to one or more embodiments, the determination to configure the source cell 18c as the DL CA SCell 18 for the wireless device 22 is made in response to accepting a handover request associated with the source cell 18c.

According to one or more embodiments, the processing circuitry 68 of, for example, network node 16b providing target cell 18b, is further configured to provide a plurality of cell-radio network temporary identifier, C-RNTI, values to the source to increase a probability of a C-RNTI value being available at both the target cell 18b and the source cell 18c. According to one or more embodiments, the processing circuitry 68 of, for example, network node 16b providing target cell 18b, is further configured to cause transmission of the DL CA SCell 18 configuration to the source cell 18c during handover. According to one or more embodiments, the at least the portion of information specific to the wireless device 22 includes at least one of: a last wireless device 22 reported downlink quality or a latest estimated downlink signal to interference and noise ratio; a last wireless device 22 reported downlink transmission rank; and activated transmission configuration indicator, TCI, states for at least one of physical downlink shared channel and physical downlink control channel.

Figure 10:
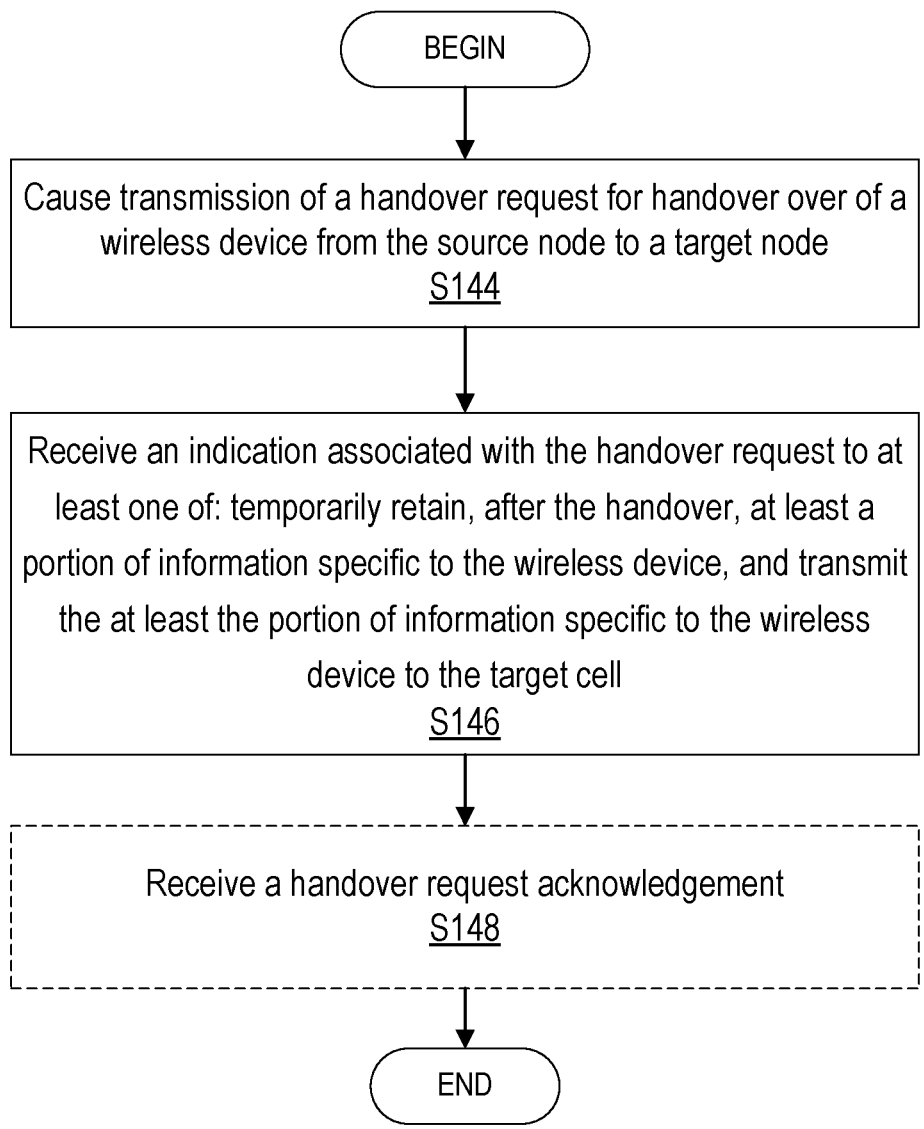
FIG. 10 is a flowchart of another exemplary process in a source cell according to some embodiments of the present disclosure.

FIG. 10 is a flowchart of an exemplary process in a source cell 18c, which may be provided by network node 16c, according to some embodiments of the present disclosure. One or more Blocks and/or functions performed by source cell 18c that may be provided by network node 16c may be performed by one or more elements of network node 16c such as by retention unit 74 in processing circuitry 68, processor 70, radio interface 62, etc. In one or more embodiments, source cell 18c, which may be provided by network node 16c, such as via one or more of processing circuitry 68, processor 70, retention unit 74, communication interface 60 and radio interface 62 is configured to cause (Block S144) transmission of a handover request for handover over of a wireless device 22 from the source cell 18c to a target cell 18b, as described herein. In one or more embodiments, source cell 18c, which may be provided by network node 16c, such as via one or more of processing circuitry 68, processor 70, retention unit 74, communication interface 60 and radio interface 62 is configured to receive (Block S146) an indication associated with the handover request to at least one of: temporarily retain, after the handover, at least a portion of information specific to the wireless device (22), and transmit the at least the portion of information specific to the wireless device (22) to the target cell (18b), as described herein. For example, the indication may further indicate or alternatively indicate for the source cell 18c to send the wireless device 22 specific information to the target cell 18b if a central scheduler is implemented in the Pcell, which is the target cell 18b for handover.

In one or more embodiments, one or more of the processing circuitry 68, processor 70, communication interface 60, handover unit 32, radio interface 62, etc. may be configured to provide to the target cell 18b and/or receive from the target cell 18b information such as a list or indication of a list of available CRNTI(s), i.e., CRNTI values. In comparison, the wireless device 22 specific information may be sent to the Pcell, in one or more embodiments, when a central scheduler is in the Pcell. In one or more embodiments, source cell 18c, which may be provided by network node 16c, such as via one or more of processing circuitry 68, processor 70, retention unit 74, communication interface 60 and radio interface 62 is configured to optionally receive (Block S148) a handover request acknowledgement, as described herein.

According to one or more embodiments, the processing circuitry 68 of, for example, network node 16c providing source cell 18c, is further configured to receive a downlink carrier aggregation secondary cell, DL CA SCell, configuration, during handover, for implementation after handover. According to one or more embodiments, the processing circuitry 68 of, for example, network node 16c providing source cell 18c, is further configured to receive a radio resource control, RRC, message associated with the handover request, the RRC message including a downlink carrier aggregation secondary cell, DL CA SCell, configuration. According to one or more embodiments, the at least the portion of information specific to the wireless device 22 includes beamforming precoder information.

According to one or more embodiments, the processing circuitry 68 of, for example, network node 16c providing source cell 18c, is further configured to receive a plurality of cell-radio network temporary identifier, C-RNTI, values to increase a probability of a C-RNTI value being available at both the target cell 18b and the source cell 18c. According to one or more embodiments, the at least the portion of information specific to the wireless device 22 includes at least one of: a last wireless device 22 reported downlink quality or a latest estimated downlink signal to interference and noise ratio; a last wireless device 22 reported downlink transmission rank, and activated transmission configuration indicator, TCI, states for at least one of physical downlink shared channel and physical downlink control channel.

Having described the general process flow of arrangements of the disclosure and having provided examples of hardware and software arrangements for implementing the processes and functions of the disclosure, the sections below provide details and examples of arrangements for handover process and carrier aggregation configuration at the same time and/or performing carrier aggregation configuration during the handover process.

Embodiments provide handover process and carrier aggregation configuration at the same time and/or performing carrier aggregation configuration during the handover process.

One or more of the following steps may be implemented for performing such handover (HO) and CA at the same time and/or at least partial overlapping times:

1. For a HO due to UL coverage, when the source cell 18c sends such as via processing circuitry 68, processor 70, communication interface 60, retention unit 74, etc. a handover request to the target cell 18b, the source cell 18c may include DL quality measurements associated with the source cell 18c and the target cell 18b.

For example, the wireless device 22 is assumed to initially have a RRC connection with a serving cell 18c, i.e., source cell 18c. That is, for the sake of simplicity, the wireless device 22 is assumed to initially have a RRC connection with one serving cell. The wireless device 22 may be configured with CA or dual connectivity. The serving cell 18c, i.e., source cell 18c, monitors such as processing circuitry 68, radio interface 62, processor 70, etc., wireless device 22's UL quality. The UL quality may be determined based at least in part on one or more of SRS (Sounding Reference Signal), PUCCH (Physical Uplink Control Channel) and/or PUSCH (Physical Uplink Shared Channel), which can be beamformed.

If the UL quality associated with the source cell 18c is not good enough (i.e., if the UL quality does not meet a predefined performance threshold and/or predefined performance criterion), the wireless device 22 is configured to search for cells 18 on a different carrier frequency (f) from DL perspective that meets the predefined performance threshold and/or predefined performance criterion. The wireless device 22 measures such as via one or more of processing circuitry 84, radio interface 82, processor 86, etc. DL link quality of the other cells 18 such as neighbor cells 18 and reports cells 18 associated with good DL link quality (e.g., DL link quality that meets a predefined performance/quality threshold and/or predefined performance/quality criterion). The current serving cell 18c, which is referred to as the source cell 18c for/during handover, may select a handover target cell 18b based on wireless device 22's DL measurement report. The source cell 18c prepares the handover request message to be sent to the target cell 18b, where the handover request message includes the DL measurements for both the source cell 18c and the target cell 18b.

2. The target cell 18b receives such as via one or more of processing circuitry 68, processor 70, handover unit 32, communication interface 60, etc. the handover (HO) request message and determines whether to accept the HO request based at least in part on the estimation of UL quality in the target cell 18*b*. For example, after receiving the handover request from the source cell 18*c*, the target cell 18*b* estimates such as via one or more of processing circuitry 68, processor 70, handover unit 32, radio interface 62, etc. the UL quality for the wireless device 22 such as by receiving measurement information from the wireless device 22 and/or by performing one or more measurements, for example. If the estimated UL quality in the target cell 18*b* is good enough (for example, meets a predefined performance/quality threshold and/or meets a predefined performance/quality criterion and/or better than the UL quality for the source cell 18*c*), the handover request is accepted by the target cell 18*b* such as via one or more of processing circuitry 68, processor 70, handover unit 32, etc.

3. If the target cell 18*b* determines such as via one or more of processing circuitry 68, processor 70, communication interface 60, handover unit 32, etc. to accept the HO request, the target cell 18*b* may also determine such as via one or more of processing circuitry 68, processor 70, communication interface 60, handover unit 32, etc. whether to configure the source cell 18*c* as a DL CA Scell based at least in part on one or more of wireless device 22 capability, source cell DL quality, CA configuration in network, etc. For example, after the target cell 18*b* determines such as via one or more of processing circuitry 68, processor 70, communication interface 60, handover unit 32, etc. to accept the handover request, the target cell 18*b* may check such as via one or more of processing circuitry 68, processor 70, communication interface 60, radio interface 62, handover unit 32, etc. the wireless device 22 capability in terms of CA to determine if the source cell 18*c* can be configured as a DL CA S cell, and may also determine if the CA configuration is supported in the network. The target cell 18*b* may also determine/check such as via one or more of processing circuitry 68, processor 70, communication interface 60, handover unit 32, etc. if the DL measurement of the source cell 18*c* meets a predefined performance/quality threshold and/or predefined performance/quality criterion. If the DL measurement of the source cell 18*c* meets the predefined performance/quality threshold and/or predefined performance/quality criterion, the target cell 18*b* may decide such as via one or more of processing circuitry 68, processor 70, communication interface 60, handover unit 32, etc. to perform handover and DL CA configuration at the same time or during at least partially overlapping times, and/or to generally perform the handover process while also performing the DL CA configuration process.

4. If the target cell 18*b* determines to configure the source cell 18*c* as DL CA Scell 18, the target cell 18*b* may request such as via one or more of processing circuitry 68, processor 70, communication interface 60, handover unit 32, etc. the source cell 18*c* to provide Scell configuration information and may also request that the source cell 18*c* (which was serving the wireless device 22 before handover) to keep or send at least some wireless device 22 specific information. For example, the wireless device 22 specific information may include one or more of best wide beam and best narrow beam in case of high band cell, among other information specific to the wireless device 22 may be used for CA, where "best" as used herein may correspond to having a higher quality metric compared to like elements such as wide beams or narrow beams. Quality metric may include a power, SINR, SNR, and/or other beam metric known in the art. In one or more embodiments, the target cell 18*b* provides such as via one or more of processing circuitry 68, processor 70, communication interface 60, handover unit 32, etc. multiple C-RNTI values that are available to the target cell 18*b* such that the source cell 18*c* can select such as via one or more of processing circuitry 68, processor 70, communication interface 60, handover unit 32, etc. one C-RNTI from the multiple C-RNTI values that is also available to the source cell 18*c*. The source cell 18*c* may inform such as via one or more of processing circuitry 68, processor 70, communication interface 60, handover unit 32, etc. the target cell 18*b* about its C-RNTI selection.

In other words, if the target cell 18*b* plans to perform handover and DL CA processes together, the target cell 18*b* may need to get/acquire such as via one or more of processing circuitry 68, processor 70, radio interface 62, handover unit 32, etc. some cell-specific and wireless device 22-specific info (including RRC configuration) from the source cell 18*c* in order to configure the source cell 18*c* as a DL CA Scell. The cell-specific information can be obtained in advance as described above, and the wireless device 22-specific information can be requested by the target cell 18*b* such as via one or more of processing circuitry 68, processor 70, radio interface 62, handover unit 32, etc. in advance as well such as when the cell-specific information is requested, for example. Among the wireless device 22-specific information, it may be advantageous for the target cell 18*b* to allocate such as via one or more of processing circuitry 68, processor 70, communication interface 60, handover unit 32, etc. C-RNTI when handover and Scell configuration is performed at the same time. Since any C-RNTI value can be assigned to the wireless device 22 during a handover, it may be more expedite to find a C-RNTI value that is available to both the source cell 18*c* and target cell 18*b*. In one or more embodiments, the Scell 18 may assign the wireless device 22 the same C-RNTI value that is assigned to the wireless device 22 by the Pcell 18*b*, i.e., target cell 18*b*, when the Scell 18*c* is configured after Pcell 18*b* handover.

There are various ways for the two cells 18 to allocate a C-RNTI value for the wireless device 22. One option is for the source cell 18*c* to provide a list of RNTI values that are available to the source cell 18*c* in the handover request message. Based at least in part on the list of RNTI values, the target cell 18*b* can select such as via one or more of processing circuitry 68, processor 70, communication interface 60, handover unit 32, etc. a value that is also available to itself. Another option involves the target cell 18*b* sending such as via one or more of processing circuitry 68, processor 70, communication interface 60, handover unit 32, etc. a list of RNTI values that are available to the target cell 18*b* after the target cell 18*b* decides such as via one or more of processing circuitry 68, processor 70, communication interface 60, handover unit 32, etc. to accept the handover request and to perform handover and Scell configuration at the same time. However, there is a possibility that the source cell 18*c* will not be able to select any of the RNTI values from the list. This situation is considered in the following:

If none of the RNTI values provided by the other cell 18 (e.g., target cell 18*b*) are available locally, the local cell 18 (e.g., source cell 18c) can inform the other cell 18. Then no Scell 18 may be configured, i.e., source cell 18c may not be configurable as a DL CA Scell in this instance. However, handover of the wireless device 22 from the source cell 18c to the target cell 18b can proceed as long as the handover request is accepted by the target cell 18b. Another option is to configure the DL CA Scell 18 even if no C-RNTI value is available to both cells. A C-RNTI value may be assigned by the Pcell, e.g., cell 18b. When the value is available to the Scell 18 later in time, the value may be assigned to the wireless device 22. The Scell 18 may inform the Pcell that the C-RNTI has been assigned to the wireless device 22 by the Scell 18.

If the target cell 18b determines such as via one or more of processing circuitry 68, processor 70, communication interface 60, handover unit 32, etc. to perform handover and DL CA together, and a C-RNTI value has been allocated successfully, the target cell 18b requests such as via one or more of processing circuitry 68, processor 70, communication interface 60, handover unit 32, etc. the source cell 18c to keep at least some of the wireless device 22 specific information at the source cell 18c. The wireless device 22 specific information may include one or more of the following:

Wireless device 22's DL quality may correspond to an estimated SINR that may be based on at least one or more of beamforming gain estimation, HARQ feedback, power boosting and wireless device 22 reported CQI.

Physical Downlink Control Channel (PDCCH)/Physical Downlink Shared Channel (PDSCH) beamforming precoder that may correspond to one or more of wireless device 22 reported PMI, network node 16 calculated precoder, the indices for the best wide and/or narrow beams, etc.

PDSCH rank.

Activated Transmission Configuration Indication (TCI) states for PDSCH and PDCCH.

In other words, in one or more embodiments, the source cell 18c may keep/retain, in memory 72, some or all necessary wireless device 22 specific information such that the source cell 18c (i.e., a DL CA Scell after handover) can start transmitting data to the wireless device 22 as early as possible. If a central scheduler resides on the primary cell or the target cell 18b for handover, the target cell 18b may request the source cell 18c to send the wireless device 22 specific information to the target cell 18b. In particular, in case of inter network node 16 CA where the source cell 18c belongs to another network node 16, the source cell 18c/network node 16 may be able to reuse some or all wireless device 22 specific configuration and information for DL CA. Therefore, in this case, it may be sufficient that the target cell 18b includes only one indication to the source cell 18c to keep the wireless device 22 specific configuration and information to the source cell. In general and with respect to one or more embodiments, the source cell 18c and target cell 18b may be provided to, i.e., belong to, the same network node 16 or different network nodes 16 (inter network node 16 example).

5. The target cell 18b prepares such as via one or more of processing circuitry 68, processor 70, communication interface 60, handover unit 32, etc. a RRC reconfiguration message for both handover and DL CA Scell configuration and includes the RRC reconfiguration message in the handover request acknowledgement. The source cell 18c then forwards such as via one or more of processing circuitry 68, processor 70, communication interface 60, retention unit 74, etc. the RRC Reconfiguration message to the wireless device 22. Once the target cell 18b receives such as via one or more of processing circuitry 68, processor 70, communication interface 60, radio interface 62, handover unit 32, etc. the RRC Reconfiguration complete message, the target cell 18b informs such as via one or more of processing circuitry 68, processor 70, communication interface 60, handover unit 32, etc. the source cell 18c about the reception. The target cell 18b, which is the primary cell for carrier aggregation, may want to initiate and/or cause activation of the Scell, which is the source cell for handover. The source cell 18c may then activate such as via one or more of processing circuitry 68, processor 70, communication interface 60, retention unit 74, etc. one or more TCI states for PDCCH/PDSCH. When the source cell, which is now a Scell 18, is requested to transmit data to the wireless device 22, the source cell 18c (i.e. Scell 18) can use the saved beamforming precoder for transmitting the data before obtaining a new beamforming precoder, thereby allowing the source cell 18c to transmit data such as via radio interface 62 as an Scell 18 to the wireless device 22 quicker than existing systems where Scell configuration would be initiated after handover, and not during handover.

In one or more embodiments, if the source cell 18 is not informed such as via communication interface 60, retention unit 74, etc. by the target cell 18b within a predefined time (i.e., time limit), after the source cell 18c sends a RRC reconfiguration message, that the target cell 18b received the RRC reconfiguration complete message, the source cell 18c may release such as via processing circuitry 68, processor 70, retention unit 74, etc. the wireless device 22 specific information. In one or more embodiments, the reconfiguration message for handover and DL CA Scell may be included in a different message from the handover request acknowledgment so long as the reconfiguration message is communicated to the source cell 18c during the handover process.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings. A variety of modifications and variations are possible in light of the above teachings without departing from the scope of the following claims.

What is claimed is:

1. A target cell for a handover of a wireless device from a source cell to the target cell, the target cell comprising processing circuitry configured to:
   determine a downlink carrier aggregation secondary cell, DL CA SCell, configuration that configures the source cell as a DL CA Scell for the wireless device during the handover of the wireless device from the source cell to the target cell;
   cause transmission of the DL CA SCell configuration to the source cell during the handover; and
   cause transmission of an indication to the source cell, the indication being based at least in part on the DL CA SCell configuration and triggering the source cell to at least one of:
      temporarily retain, after the handover, at least a portion of information specific to the wireless device; and
      transmit, to the target cell, the at least the portion of information specific to the wireless device.

2. The target cell of claim 1, wherein the processing circuitry is further configured to prepare a radio resource control, RRC, message associated with a handover request and include the DL CA SCell configuration for the source cell in the RRC message.

3. The target cell of claim 1, wherein the at least the portion of information specific to the wireless device includes beamforming precoder information.

4. The target cell of claim 1, wherein the determination of the DL CA SCell configuration is made in response to accepting a handover request associated with the source cell.

5. The target cell of claim 1, wherein the processing circuitry is further configured to provide a plurality of cell-radio network temporary identifier, C-RNTI, values to the source cell to increase a probability of a C-RNTI value being available at both the target cell and the source cell.

6. The target cell of claim 1, wherein the at least the portion of information specific to the wireless device includes at least one of:
   a last wireless device reported downlink quality or a latest estimated downlink signal to interference and noise ratio;
   a last wireless device reported downlink transmission rank; and
   activated transmission configuration indicator, TCI, states for at least one of physical downlink shared channel and physical downlink control channel.

7. A source cell comprising processing circuitry configured to:
   cause transmission of a handover request for a handover of a wireless device from the source cell to a target cell;
   receive a downlink carrier aggregation secondary cell, DL CA SCell, configuration during the handover, the DL CA SCell configuration configuring the source cell as a DL CA SCell for the wireless device during the handover of the wireless device from the source cell to the target cell;
   receive an indication associated with the handover request, the indication being based at least in part on the DL CA SCell configuration and triggering the source cell to at least one of:

temporarily retain, after the handover, at least a portion of information specific to the wireless device; and
transmit, to the target cell, the at least the portion of information specific to the wireless device.

8. The source cell of claim 7, wherein the processing circuitry is further configured to receive a radio resource control, RRC, message associated with the handover request, the RRC message including configuration.

9. The source cell of claim 7, wherein the at least the portion of information specific to the wireless device includes beamforming precoder information.

10. The source cell of claim 7, wherein the processing circuitry is further configured to receive a plurality of cell-radio network temporary identifier, C-RNTI, values to increase a probability of a C-RNTI value being available at both the target cell and the source cell.

11. The source cell of claim 7, wherein the at least the portion of information specific to the wireless device includes at least one of:
a last wireless device reported downlink quality or a latest estimated downlink signal to interference and noise ratio;
a last wireless device reported downlink transmission rank; and
activated transmission configuration indicator, TCI, states for at least one of physical downlink shared channel and physical downlink control channel.

12. A method implemented in a target cell for a handover of a wireless device from a source cell to the target cell, the method comprising:
determining a downlink carrier aggregation secondary cell, DL CA SCell, configuration that configures the source cell as a DL CA Scell for the wireless device during the handover of the wireless device from the source cell to the target cell;
causing transmission of the DL CA SCell configuration to the source cell during the handover; and
causing transmission of an indication to the source cell, the indication being based at least in part on the DL CA SCell configuration and triggering the source cell to at least one of:
temporarily retain, after the handover, at least a portion of information specific to the wireless device; and
transmit, to the target cell, the at least the portion of information specific to the wireless device.

13. The method of claim 12, further comprising preparing a radio resource control, RRC, message associated with a handover request and including the DL CA SCell configuration for the source cell in the RRC message.

14. The method of claim 12, wherein the at least the portion of information specific to the wireless device includes beamforming precoder information.

15. The method of claim 12, wherein the determination of the DL CA SCell configuration is made in response to accepting a handover request associated with the source cell.

16. The method of claim 12, further comprising providing a plurality of cell-radio network temporary identifier, C-RNTI, values to the source cell to increase a probability of a C-RNTI value being available at both the target cell and the source cell.

17. The method of claim 12, wherein the at least the portion of information specific to the wireless device includes at least one of:
a last wireless device reported downlink quality or a latest estimated downlink signal to interference and noise ratio;
a last wireless device reported downlink transmission rank; and
activated transmission configuration indicator, TCI, states for at least one of physical downlink shared channel and physical downlink control channel.

18. A method implemented by a source cell, the method comprising:
causing transmission of a handover request for a handover of a wireless device from the source cell to a target cell;
receiving a downlink carrier aggregation secondary cell, DL CA SCell, configuration during the handover, the DL CA SCell configuration configuring the source cell as a DL CA SCell for the wireless device during the handover of the wireless device from the source cell to the target cell;
receiving an indication associated with the handover request, the indication being based at least in part on the DL CA SCell configuration and triggering the source cell to at least one of:
temporarily retain, after the handover, at least a portion of information specific to the wireless device; and
transmit, to the target cell, the at least the portion of information specific to the wireless device.

19. The method of claim 18, further comprising receiving a radio resource control, RRC, message associated with the handover request, the RRC message including the DL CA SCell configuration.

20. The method of claim 18, wherein the at least the portion of information specific to the wireless device includes beamforming precoder information.

21. The method of claim 18, further comprising receiving a plurality of cell-radio network temporary identifier, C-RNTI, values to increase a probability of a C-RNTI value being available at both the target cell and the source cell.

22. The method of claim 18, wherein the at least the portion of information specific to the wireless device includes at least one of:
a last wireless device reported downlink quality or a latest estimated downlink signal to interference and noise ratio;
a last wireless device reported downlink transmission rank; and
activated transmission configuration indicator, TCI, states for at least one of physical downlink shared channel and physical downlink control channel.

* * * * *